Dec. 14, 1948.  J. BUECHEK  2,456,372
METHOD OF ROLLING BAKING DOUGH
Filed Sept. 25, 1943  2 Sheets-Sheet 1
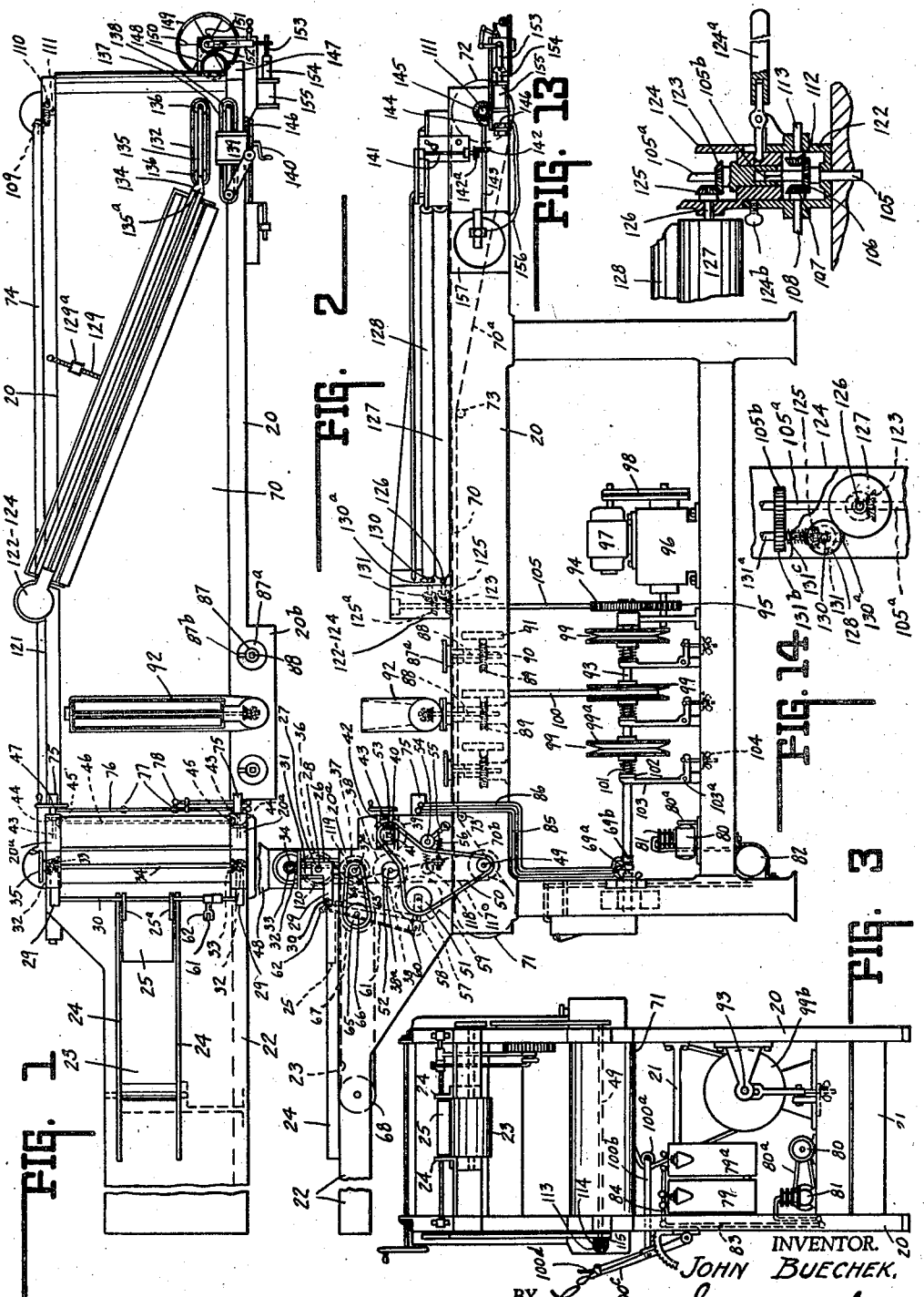
INVENTOR.
JOHN BUECHEK.
BY
ATTORNEYS.

Dec. 14, 1948. J. BUECHEK 2,456,372
METHOD OF ROLLING BAKING DOUGH
Filed Sept. 25, 1943 2 Sheets-Sheet 2
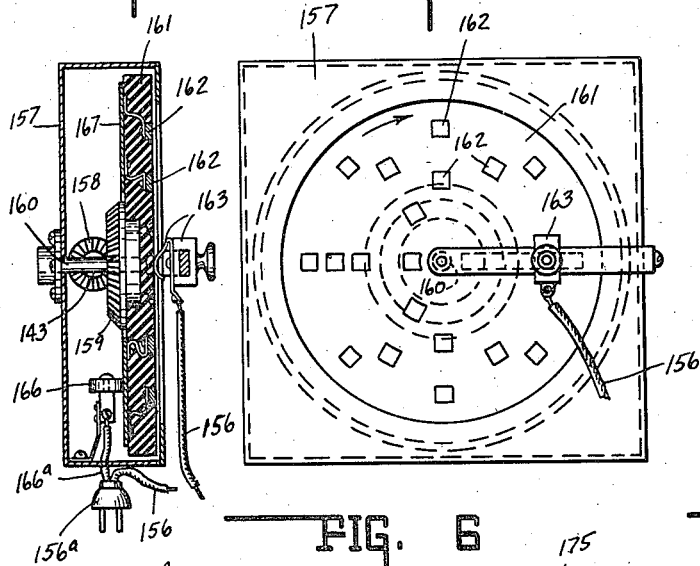
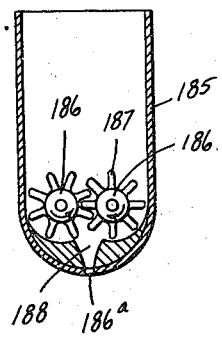
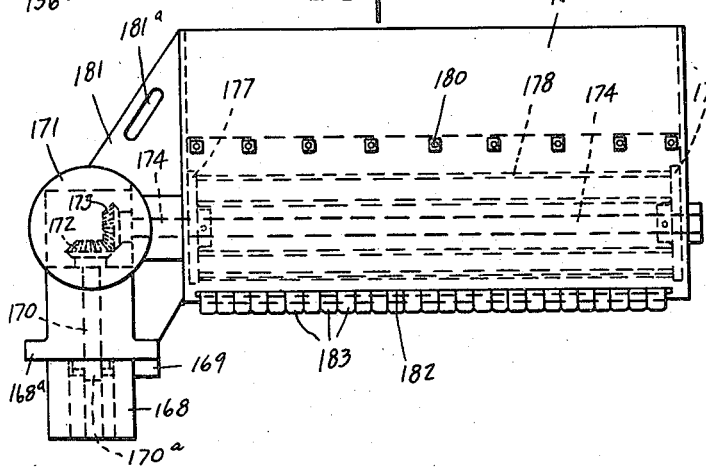
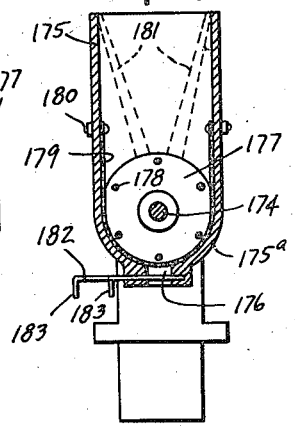
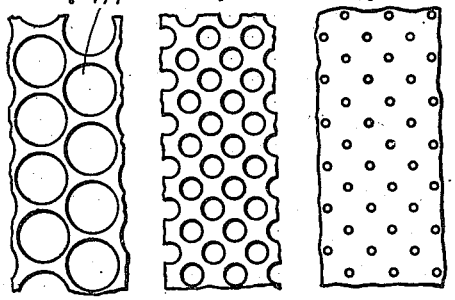
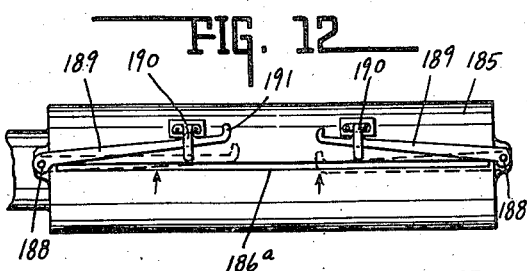
INVENTOR.
JOHN BUECHEK.
ATTORNEYS.

Patented Dec. 14, 1948

2,456,372

UNITED STATES PATENT OFFICE 2,456,372

METHOD OF ROLLING BAKING DOUGH

John Buechek, Kokomo, Ind., assignor, by mesne assignments, of one-half to American Bakers Machinery Company, St. Louis, Mo., a corporation Original application October 13, 1941, Serial No. 414,760, now Patent No. 2,337,539, dated December 28, 1943. Divided and this application September 25, 1943, Serial No. 503,740

1 Claim. (Cl. 107—54)

This invention relates to the process of forming rolled dough portions suitable for the formation of several different kinds of bakery products, such as sugar rolls, cinnamon rolls, nut rolls, et cetera, by way of example only.

The chief object of this invention is to reduce manual labor incident to the formation of dough portions suitable for baking the aforesaid products, by handling the dough continuously supplied to mechanically operable means or apparatus which in turn rolls the advancing ribbon or sheet of dough into a roll of dough from which, if, and when desired, portions of predetermined length may be cut for roll formation et cetera.

The process primarily contemplates forming dough into a sheet of predetermined width and thickness and then coating the same with a baking oil and coating the final sealing edge with water, as desired or required, then supplying thereto while in sheet form, the various additional ingredients, such as powdered sugar for sugar rolls, chopped nuts for nut rolls, cinnamon, et cetera, for cinnamon rolls, jelly, et cetera, for jelly rolls, and then as the sheet of dough so covered or supplied is advanced, the sheet is rolled on the bias relative to its direction of travel, the rolling taking place from one side edge and progressing toward the other water moistened side edge in the advancing of the sheet until the sheet is completely rolled into roll form, with the various added ingredients applied and included within the roll. The advancing roll then is sealed in roll formation, as it were, in its continued advance and then may be manually or automatically severed to the desired length to form the roll portions for subsequent baking. Such roll lengths by way of illustration, may be from one to twelve inches in length.

The chief feature of the invention consists in the bias type rolling operation of the dough while it is advancing as a sheet after having been supplied with various ingredients desired to be included in the finally baked product.

Other objects and features of the invention will be set forth more fully hereinafter.

Since a better understanding of the process can be had by describing a machine capable of functioning to perform that process, reference now will be had to such a machine and from the operation thereof as hereinafter set forth in conjunction with the description of the machine parts, the aforesaid method will be clearly understood.

This application is a division of copending application Serial No. 414,760 filed October 13, 1941, now Patent No. 2,337,539, dated December 28, 1943, and entitled Baking dough rolling machine.

The full nature of the invention will be understood from the accompanying drawings and the following description and claim:

In the drawings:

Fig. 1 is a top plan view of one apparatus embodiment of the invention.

Fig. 2 is a side elevational view of the same.

Fig. 3 is an end view of the same.

Fig. 4 is a central sectional view and Fig. 5 is an elevational view of a circuit breaker arrangement controlling the roll cut-off or roll section forming mechanism.

Fig. 6 is a side view and Fig. 7 is a central sectional view of one of the feeding hoppers for supplying sugar, chopped raisins, nuts, cinnamon, and the like.

Fig. 8 illustrates a portion of a screen suitable for supplying raisins, et cetera.

Fig. 9 is a similar view of a screen for supplying chopped nuts, et cetera.

Fig. 10 is a similar view of a screen for supplying sugar, cinnamon, and other comminuted materials.

Fig. 11 is a sectional view and Fig. 12 is a bottom plan of another form of hopper arrangement mechanism for the application of cream paste, jelly, or the like, to the dough.

Fig. 13 is an enlarged sectional view of the drive and rotatable support for the turnup roll, etc.

Fig. 14 is a view taken at right angles to Fig. 13 to illustrate the adjustable drive.

In Figs. 1 to 3 of the drawings, the numeral 20 indicates two side frames suitably connected together as at 21 at various locations. There is supported by this frame work a table or platform 22 and running in the same is an endless belt conveyor 23 that runs between two guides 24, the strip of dough being confined by these guides and being moved by this belt conveyor.

The baker applies the dough at the receiving or left hand end of the platform 22 in alignment with the belt conveyor 23, having previously applied sufficient flour, or the like, to the platform ahead of the belt, so that the sheet of dough is suitably dusted on its lower face. The baker pushes this hand formed sheet of dough into the throat formed by the guides 24 projecting toward the left beyond the endless belt conveyor 23 and the surplus dough on either side of these guides is removed and subsequently worked up into another sheet. The baker in feeding this dough tries to form a fairly flat sheet of approximately proper thickness and width.

Before this dough is exhausted, the baker prepares another piece so that at the proper time he can crimp the latter to the former before it passes completely through the sheeter.

The endless belt conveyor 23 then carries the dough forward and to the right in Figs. 1 and 2, whereupon, while on the conveyor, the sheet of dough encounters a flattening element 25. This flattening element 25 has about 1½" throw to and fro towards and away from the conveyor 23 and at each reciprocation it mashes or flattens out the dough between the two guides and on the conveyor.

Mounted in each of the upright portions 20a of the frame structure 20 is a guideway 26 which mounts a crosshead 27 providing a bearing for one end of the shaft 28. This crosshead has a rearwardly directed arm 29 which pivotally supports as at 30 the beater 25, the latter having forwardly extending arms 25a.

Each crosshead 27 is provided with a screw-threaded attachment member 31 and these two members mount at their upper ends bevel gears 32 that mesh with similar bevel gears 33 carried by the shaft 34. This shaft 34 mounts a handwheel 35 on one end or the shaft may be extended and may be provided with a handwheel at both ends. By means of this adjustment the height of the beater 25 and the height of the pressure roller 36, which is the upper roller engaging the upper surface of the sheet of dough, may be adjusted.

Immediately beneath roller 36 is another roller 37 which has a fixed position and said roller 37 has its upper, longitudinal element substantially coplanar with that of the platform or table 22 and the upper run of the belt conveyor 23.

Immediately below the roller 37 is another roller 38 and forwardly thereof is a roller 39 mounted on shaft 40 carried by crossheads 41 slidably supported in the ways or guides 42. A screw element 43 is arranged to advance and return the roller 39. Each of these screws is provided with a bevel gear 44 and these bevel gears mesh with similar gears 45 carried by a shaft 46. A handwheel 47 is arranged to simultaneously move the crossheads 41 forwardly or rearwardly and thus move the roller 39 forwardly or rearwardly away from or toward the roller 38. The dough advanced by the conveyor 23 passes beneath the beater 25 and thence between the rollers 36 and 37 and then drops vertically between the two rollers 38 and 39.

There may be supported above the roller 36 a suitable dusting arrangement, not shown, the detailed construction of which may be similar to that hereinafter described. Suffice, it is indicated by the numeral 48 in Fig. 2 and supplies flour to the top surface or face of the dough sheet so that the sheet will not adhere to the upper roller 36, it being remembered that the baker has sufficiently dusted or floured the lower face of the sheet ahead of the conveyor 23. This dusting of both sides of the sheet of dough also prevents adherence of the sheet to the subsequent rollers 38 and 39. One function of the beater before mentioned is to prevent the dough from stratifying and tearing as it is borne through the two upper rollers 36 and 37.

As the sheet of dough prepared by the baker is exhausted, the baker prepares another sheet and places it immediately adjacent the rear end of the advancing sheet, which he has previously prepared, and then crimps the ends together to unite the sheets to insure continuous sheet formation for continuous production by subsequent apparatus.

In Fig. 2 the numeral 49 indicates a main power drive. A chain drive 50 passes over a sprocket pulley 51 and then passes under a sprocket pulley 52, the latter being carried by the shaft 38a, of a roller 38. It also passes over a sprocket pulley 53 carried by the shaft 40 of the roller 39. This driving chain passes over a tensioning sprocket pulley 54, mounted on a pivoted arm 55 and spring constrained as at 56. This, as stated, is a tensioning arrangement. In this way it will be observed that the rollers 38 and 39 are positively driven and in opposite directions by said chain belt 50.

Coaxial with the center of the sprocket pulley 51 is an arm 57 and mounted on the end thereof is a gear 58. This gear 58 meshes with a gear 59 also coaxial with the sprocket pulley 51 and rotatable therewith. Thus the pinion 58 rotates at a relatively high speed. The pinion 58 has an eccentric pin 60 and a rod 61 is pivotally mounted thereon so that, in the rotation of the gear 58, the rod 61 is reciprocated generally in the up and down direction.

The upper end of this eccentric rod 61 is connected to a lever arm 62 which is rigid with the shaft 30 which supports the beater 25 by means of the extensions or arms 25a. It will be remembered the shaft 30 is mounted in arms 29 constituting extensions of the crosshead 27. When the crossheads are elevated, arms 29 are elevated therewith and in a like amount, and accordingly, by means of the rod construction 61, the arm 57 rotates clockwise to permit such elevating movement without interference, yet at the same time retaining the pinion 58 in mesh with the gear 59 for power application to the beater.

The superposed upper rollers 36 and 37 are suitably driven from the main power source. The shaft 37a of the lower roller mounts a sprocket pulley 63 which is driven by a chain drive 64, in turn driving a sprocket pulley 65 carried by the shaft 66 of the pulley or drum 67, which supports the forward end of the conveyor 23. The rearward end of this conveyor is supported by the drum 68. The ratio of the drives is such that the peripheral speed of the superposed drums or rollers 36 and 37 is approximately twice that of the peripheral speed of the conveyor 23. This power application, if desired, may be provided with a tensioning device such as illustrated in Fig. 2 and indicated by the numerals 54 to 56, inclusive. For clearness, this tensioning device is intentionally omitted from the present disclosure. It might be here stated the power connection from shaft 49 to the shaft 37, etc., is positioned upon the opposite side of the machine from the side illustrated in Fig. 2. The rollers 36 and 37 have substantially the same peripheral speed as the rollers 38 and 39.

Positioned beneath the aforesaid mechanism, is an endless conveyor arrangement 70, the rearward end thereof passing over drum 71 and the forward end thereof passing over drum 72, see Fig. 2. The lower run of this conveyor is directed upwardly as indicated at 70a and 70b, by means of the idlers 73. Suitable tensioning means may be provided, such as hereinbefore described, and more specifically illustrated and indicated by numerals 54 to 56, inclusive. For clearness, same is omitted herefrom.

The power for driving the conveyor 70 is applied to the drum 72 and such power application is encased in the housing portion 74. The peripheral speed of this conveyor 70 is substantially the same as the peripheral speed of the cooperating pairs of rollers before mentioned.

Above the upper run of the conveyor 70, there is provided a pair of brackets 75 which mount a support 76 upon which are mounted a plurality of oil spray heads 77 and adjacent thereto, or rather where the lower edge of the dough sheet, referring to Fig. 1, would be positioned, is a water spray head 78. These spray heads are suitably connected by conduits to an oil reservoir 79—see Fig. 3—and a water reservoir 79a, respectively.

A motor 80, by means of a chain or belt 80a, drives a compressor 81 for supplying air to a tank 82. This motor has a power circuit which is controlled by a pressure switch so that the motor is automatically energized when the pressure falls to a predetermined amount and the motor is de-energized automatically when the pressure in the tank rises to a predetermined amount.

The tank is connected by a line 83 to a header 84 which in turn discharges to each of the tanks 79 and 79a and maintains pressure on said tanks. Consequently, air pressure forces the liquid in these tanks through the conduit 85 to the oil spray heads 77 and by means of conduit 86 to the water spray head 78 from the tanks 79 and 79a, respectively. The purpose of the oil spray is to grease all except one narrow edge strip of the entire top surface of the sheet of dough which has been previously dusted for non-adherence to the roller, so that the various materials supplied to the top surface of the dough will adhere thereto; such materials, as stated previously, being sugar, cinnamon, chopped nuts, raisins, et cetera. All connections to the several tanks 79 and 79a with the air tank 82 are provided with valves and the several discharges from these tanks to the nozzles are provided with valves, the same being omitted for clearness in the instant illustration, but such valves are of regulating and cut-off character.

From the foregoing, therefore, it will be noted that as the sheet of dough is advanced, it is sprayed with water on its lower edge, referring only to Fig. 1, for example a one inch width, and is sprayed with oil across the remainder of the entire upper face. The purpose of spraying this edge with water is to insure that when the dough is rolled up, the resulting moistened edge of the dough sheet, then in roll formation, will adhere to the adjacent portion of the roll and be sealed thereto, and by a mechanism to be hereinafter described.

To prevent oil and water discharge when the machine is not operating, electromagnetic valves 69a and 69b may be included in the lines 85 and 86, supplying oil and water, respectively, to the shower or spray heads. These valves normally would be held open as long as the machine is running and would automatically close immediately upon stoppage of the machine. This automatic control is in addition to the manual controls provided by way of the manually operable valves described. The details of these electro- or automatic controls is intentionally omitted, since normally closed electro-magnetically or solenoid openable valves are well known.

Immediately forward of the spray nozzles or heads, there is an area which may be designated as the material application area and at one side of the machine there is a support portion 205 which herein is shown provided with three sockets 87. The upper face of each provides a circular bearing 87a and a keyway or slot 87b is provided. In the center of this socket is an upwardly directed driving member 88. This driving member 88 is a shaft extending upwardly from a worm wheel 89 that meshes with a worm 90 terminating in a pulley 91. Each of the sockets is similarly provided. The material hopper structure, et cetera, generally is designated by the numeral 92 and it is superposed with relation to the conveyor 70 and the dough sheet thereon. It is of cantilever type in that the entire support of the hopper is through the socket arrangement described. Each of these material dispensers is, as is evident, detachably associated and can be interchangeably associated with any one of the sockets previously described.

Positioned beneath, see Fig. 2, the conveyor structure 70, and the several socket drives, is a shaft 93. This shaft 93 mounts a gear 94 meshing with the pinion 95 of a reduction unit 96 driven by a master motor 97 as at 98. The shaft 93 mounts as many divided pulley structures 99 as there are socket structures, before mentioned, and a belt 100 rides in the divided pulley structure and rides on the pulley 91 for driving the shaft 88, this being the power shaft for the material distributor or hopper device.

The divided pulley structure 99 has a fixed position pulley portion 99a and a slidable pulley portion 99b, the same confronting each other. The latter is constrained toward the pulley portion 99a by the spring 101, which bears against a collar 102 with which is associated a bell crank 103 pivoted at 103a and adjusted as at 104.

Associated with each belt 100 is an idler pulley 100a and same is mounted on pivotally supported arm 100b suitably controlled by manually operable hand lever 100c, the position of which may be held by pawl and ratchet with hand lever release 100d, see Fig. 3. By these two adjustments, the speed of the shaft 88 may be adjusted as desired, notwithstanding the constant speed of shaft 93.

The power for rotating the drum 72 and hence advancing or moving the conveyor 70 is derived from the motor 97 through the structures 98, 96 and 95 and the gear 94 may mesh with another power element, not shown in Fig. 2, which in turn rotates the vertical shaft 105, see Fig. 13, at the right side of the machine (top Fig. 1). Shaft 105 mounts a bevel gear 106 meshing with the bevel gear 107 carried by a shaft 108 within the housing 74. The other end of this shaft 108 carries a bevel gear 109 that meshes with a bevel gear 110 carried on the shaft 111 that supports the drum 72.

Meshing with the gear 106 is another gear 112 carried by shaft 113 which mounts at its rear end a bevel gear 114 that meshes with another gear 115 rigid with the sprocket pulley 116 that is associated with chain 117 provided with a tensioning device not shown but previously described. This belt is associated with a pulley 119 carried by the shaft 37a of the roller 37 and is associated with a sprocket pulley 120 carried by the shaft 28 of the drum 36 in the manner chain 50 is associated with sprockets 51, 52, 53 and tensioning pulley 54. The vertical shaft 105 is the main power shaft of the machine. Shaft 49, shown in Fig. 2, is the shaft which on the opposite end mounts the bevel gear 115 and the sprocket pulley 116. The shaft 113 is enclosed within the housing structure 121.

The shaft 105—see Fig. 13—is extended upwardly and into a housing arrangement 122—124. The shaft 105a therein mounts bevel pinion 123. The bevel pinion 123 meshes with the bevel pinion 125 on a shaft 126 that supports a roller structure 127, the same being very elongated, relatively speaking, and normally biased relative to the direction of travel relative to the belt 70, as shown in Fig. 1. This roller 127 rotates clockwise, looking at the lower or forward end of the roller, so that as the advancing dough sheet on its upper edge, see Fig. 1, first engages the roll 127, the dough is carried upwardly and then gradually turns back upon itself and starts the initial roll of the sheet so as to form a longitudinal roll of dough.

Shafts 105 and 105a have a detachable spline connection 105b. Housing 124 carries shaft 126 and, by handle 124a, can be elevated when clamp 124b is loosened so that roll 127 can be swung about the axis of shafts 105—105a. The biased roll 127 thus can be locked in any biased position or lie parallel to belt 70 as desired.

Immediately above roller 127 there is supported another roller 128 parallel to the roller 127 and counterweighted as at 129. This roller is carried by shaft 130 which rides in a somewhat vertical slot 130a in housing 124. The gear 131 meshes with the gear 125a carried by the shaft 131a. Gears 131b and 125b on shafts 131a and 105b, respectively, mesh with each other. The gear 125a is slidable on countershaft 131a and spring 131c normally constrains gear 125a into mesh with gear 131. The gear train relationship is such the rolls 127 and 128 rotate in the same direction and roll 128 can elevate as the dough roll increases in size, yet be positively driven, which insures pressure contact between portions of the dough roll as it is being rolled up from the sheet. The counterweight 129a for the roller 128 may be suitably adjusted on the support 129 and hence, this roller 128 controls the tightness of the dough roll resulting from the dough sheet initially contacting the roller 127 and then rolling up upon itself. Spring 131c has a force sufficient for the purpose described.

As previously explained, a narrow strip at the lower edge, see Fig. 1, of the sheet of dough has been moistened by the water supply nozzle 78 so that when that portion of the dough sheet engages the rolled up portion of the dough sheet, the pressure roller 128 causes the moistened portion of dough sheet to seal to the main body portion of the dough roll. The completed dough roll then advances forwardly and angularly, that is, to the right in Fig. 1, and downwardly relative to the two rollers 127 and 128, see Fig. 1, until it reaches the ends of these rollers. In other words, the roll changes travel direction from the direction of travel of the sheet of dough.

Adjacent the ends of the rollers 127 and 128, there is provided a pair of spaced endless conveyors in the form of guides. Herein the numeral 132 indicates one of said inlet conveyors, the same being at right angles to the supporting plane of the conveyor 70 and terminating above the same and carried by the frame work 134 of the turnup and pressure rollers and by means of the arm 135 mounting rollers 136 at opposite ends. If desired, the connection between 134 and 135 may be of pivotal character as at 135a and arranged for angular adjustment. Therefore, the cantilever type supporting frame work 134 carried by the housing 122 may be swung into any desired inclined relationship and the conveyor 132 may be arranged so that its lower run, having reference to Fig. 1, will always travel parallel to the edge of the belt 70.

Adjacent the belt 132 is another belt 137 which is carried by pulleys 138, the latter being supported by a support structure 139 that may be moved forwardly or rearwardly relative to the frame 20 and the discharge end of the belt 70 by means of the hand crank 140.

The purpose of this construction is to insure that the receiving end of this belt 137 is in proper position to receive the roll as it is discharged from the forward end of the turn-up roller. Also, this structure 139 may be so arranged that the conveyor 137 may be moved closer to the conveyor 132 or therefrom, as desired. This conveyor 137 is driven by a shaft 141 having gear 142a driven by a gear 142 on shaft 143 by means of a bevel gear 144 meshing with a bevel gear 145, on shaft 111, that is, the shaft which mounts the drum 72.

Whenever it is desired to positively drive the belt 132, the power drive may be derived from the primary shaft 105a in the housing 124 and carried along through the frame structure 134. However, this usually is not necessary just as long as one of the two confronting guide and roll sealing belts 132—137 is positively driven. The dual belt drive under certain circumstances may be highly desirable and when it is desirable, the last mentioned drive to belt 132 may be incorporated, in addition to the first mentioned drive, to belt 137, the latter being derived from the left end of the shaft 111, referring to Fig. 1.

The foregoing invention, excluding a specific description of one or more types of material dispensing apparatus associated with one or more of the sockets 87 previously described, and included in the plate formation 20b, see Fig. 1, constitutes the primary form of the invention. The dough roll formed by this device is discharged from the belt 70 from between the sealing and guiding conveyors 132 and 137 to any suitable container, endless belt structure, platform, or the like.

However, in the present invention, there is provided a power driven cutoff for forming uniform sections of the roll. This mechanism is hingedly mounted on the frame 20 as at 146, that is, the discharge end of the machine. This includes a frame arrangement 147 which is provided with a tubular element 148 that receives the dough roll as it leaves the belt 70 on the drum 72.

Beneath tubular element 148 and pivotally mounted in the frame work 147 is an open work wheel arrangement 149, the bars 150 of which constitute cutting elements since they strike across the bottom of the tube 148 and hence cut through the dough roll to sever that part of the dough roll which has passed through the tube 148. This cutting wheel 149 is intermittently rotated and preferably is intermittently rotated by means of a ratchet 151 and a pawl 152.

The pawl 152 is suitably actuated by means 153 which is of reciprocatory type and which is connected to the core 154 of a solenoid 155, current thereto being supplied by lines 156. All of this mechanism is carried by the auxiliary frame 147 pivoted at 146. Whenever desired, all of this mechanism can be swung away from in front of the discharge end of the belt 70 for the purpose described.

Referring to Fig. 2, it will be noted that shaft 143 is extended and enters the housing 157, and that the current wires 156 also enter said housing. The shaft 143 includes a bevel gear 158 which meshes with the gear 159 carried by the shaft 160. This shaft 160 mounts a contact plate 161 of insulation material. Mounted therein are suitable contacts 162. A slidable brush 163 rides the disc or plate 161. A line 156 from said brush leads to the solenoid. A contact 166 engages plate 167 on disc 161 and is in electrical connection with contacts 162. Brush 163 is arranged to successively contact arcuately spaced segments 162, the same being connected to a source of power by line 166a and plug 156a, with the result that the periodicity of operation of solenoid 155 and hence the cutoff wheel 149 for any constant rotation of shaft 143 may be obtained within the limits of the the selectivity of the slidable brush connection 163–162. Since switches of this particular type are comparatively well known in the electrical art, no further description or illustration of the same is believed necessary herein.

Reference now will be had to Figs. 6 to 10, inclusive. In this connection it is to be observed that the machine may be provided with at least three hoppers, each of which would be substantially identical to the the others except for the difference in the screen plates as represented by Figs. 8, 9 and 10, the screen plate shown in Fig. 8 being suitable for the distribution of raisins, et cetera; that shown in Fig. 9 being suitable for the distribution of chopped nuts and material of that size, and that shown in Fig. 10 being suitable for the distribution of powdered material, such as powdered sugar, sugar, cinnamon, et cetera.

It will be recalled there were provided three sockets 87 in the plate 20b. Referring to Figs. 6 and 7, there is illustrated a body portion 168 having a collar 168a and a tongue 169 below the collar portion. The body portion 168 below the collar portion 168a seats in the socket 87 and the key or tongue 169 seats in the notch or slot 87b— see Fig. 1. The body portion 168 rotatably supports a shaft 170 which mounts on its upper end in chamber 171 a bevel gear 172, the latter meshing with the bevel gear 173 carried by shaft 174 that extends outwardly into the hopper formation indicated generally by the numeral 175. The detachable drive connection associated with the drive shaft 88 is indicated as at 170a in Fig. 6.

Hence, when the structure just described is associated with the socket 87 and the belt 100 connects the pulley 91 with the split pulley 99 in registration therewith and the belt tension is adjusted as described, the shaft 174 of the hopper mechanism will be rotated at the predetermined desired speed. But one of these structures is illustrated in Fig. 1 and is designated broadly by the numeral 175.

The hopper structure 175 at each end rotatably supports the shaft 174, the hopper having a semicircular bottom portion 175a with a longitudinal throat 176 the full width of the hopper. Rotatably supported within the hopper and carried by said shaft 174 by means of the collars or discs 177 are the rods 178. These rods 178 constitute agitating elements. A screen 179 is interposed between the agitator and the hopper bottom 175a and is extended upwardly and anchored as at 180 to the side wall of the hopper. Portions 181 are reenforcing ribs which may have hand holes 181a therein.

The length of this orifice may be regulated by the slidably supported cutoff slides 182 having the finger pieces 183. When these slides are pulled back, see Fig. 7, the throat 176 can discharge whatever is passed through the screen 179. Clogging of the screen 179 is prevented by the agitator arrangement. The screen includes apertures 179a as shown in Fig. 8.

Figs. 9 and 10 merely show a slightly different form of screen insofar as the size and number of apertures is concerned. The illustration in Figs. 8 to 10, inclusive, are to be considered as illustrative in character. As previously set forth, the speed of rotation of shaft 174 is determined by the dual adjustment—see Figs. 1 and 3. As shown in Fig. 1, but one material discharging hopper of cantilever supported type is illustrated. The machine, however, is adapted to mount three of these material discharging hoppers—see Figs. 1 and 2. These immediately follow, insofar as dough sheet application is concerned, the oil and water spray applications.

Reference now will be had to Figs. 11 and 12. It is to be understood the same general type of drive connection and support is provided as is illustrated in Figs. 6 and 7. However, in this instance, the central shaft 174 is not utilized but an offset drive arrangement is utilized to drive one of a pair of meshing corrugated rollers. The hopper in this instance is indicated by the numeral 185 and the two corrugated rollers, indicated by the numeral 186, have the ridges 187 that mesh with each other. The rotation thereof is as indicated by the arrows and the material carried around by the ridges and between the ridge and the hopper is discharged into the throat 188 and from it as at 188a is applied to the top layer of the dough sheet therebeneath.

The hopper 185 is adapted to receive a creamy paste such as lemon, vanilla, or chocolate, et cetera, cream for example, or a jelly paste. In this form of the invention, the apertured screens naturally are not employed. Fig. 12 illustrates the bottom of the hopper shown in Fig. 11 and illustrates how the width of the paste discharged can be regulated to correspond to the width of the dough sheet therebeneath.

Pivoted at each end of hopper 185 at 188 is a cut-off arm 189 having frictional contact with the bracket 190 carried by the underside of the hopper. Portion 191 of the arm is the hand adjusting portion. Two dotted positions are illustrated. When positioned as shown (see right side dotted), minimum width of cream is discharged if both are positioned alike. A wider stream is discharged if both are positioned as shown (see dotted left hand side of Fig. 12). Full width discharge is effected when both control arms are positioned as shown by the full lines.

By the terminology water, as hereinafter used in the claims, the same is intended to comprehend within its scope water per se or an aqueous solution including milk, a syrup or the like, or other liquid suitable for the purpose described.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

The method of continuously forming a dough roll for subsequent baking from a continuously advancing sheet of dough of uniform width and thickness without stratifications or tears therein comprising, applying, continuously, prior to rolling, oil to the major width of the sheet except for the longitudinal edge portion to be last rolled, applying continuously water to that edge portion, progressively turning upwardly the oiled edge of the sheet and then progressively turning inwardly the turned up edge upon the sheet while turning up the adjacent portion of the sheet until the watered edge is finally turned upon the resulting roll, the second turning being accompanied by continuous application of uniform pressure to the roll as formed and regardless of roll diameter.

JOHN BUECHEK.

REFERENCES CITED

The following references are of record in the file of this patent:

UNITED STATES PATENTS

| Number | Name | Date |
|---|---|---|
| Re. 22,399 | Fonken | Dec. 7, 1943 |
| 78,778 | Wilmans et al. | June 9, 1868 |
| 923,360 | Kruse | June 1, 1909 |
| 1,176,648 | Callow et al. | Mar. 21, 1916 |

FOREIGN PATENTS

| Number | Country | Date |
|---|---|---|
| 208,197 | Great Britain | Dec. 19, 1923 |